(12) United States Patent
Triebel et al.

(10) Patent No.: US 11,865,910 B2
(45) Date of Patent: Jan. 9, 2024

(54) DEVICE FOR CONTROLLING AND GUIDING A CLOSURE ELEMENT

(71) Applicant: HBPO GmbH, Lippstadt (DE)

(72) Inventors: Nico Triebel, Paderborn (DE); Daniel Knorr, Bielefeld (DE); Insoo Ha, Erwitte (DE)

(73) Assignee: HBPO GmbH, Lippstadt (DE)

(*) Notice: Subject to any disclaimer, the term of this patent is extended or adjusted under 35 U.S.C. 154(b) by 153 days.

(21) Appl. No.: 17/440,063

(22) PCT Filed: Mar. 17, 2020

(86) PCT No.: PCT/EP2020/057295
§ 371 (c)(1),
(2) Date: Sep. 16, 2021

(87) PCT Pub. No.: WO2020/187912
PCT Pub. Date: Sep. 24, 2020

(65) Prior Publication Data
US 2022/0185100 A1 Jun. 16, 2022

(30) Foreign Application Priority Data
Mar. 18, 2019 (DE) ...................... 10 2019 106 826.6

(51) Int. Cl.
*B60K 11/00* (2006.01)
*B60K 11/08* (2006.01)

(52) U.S. Cl.
CPC ................... *B60K 11/085* (2013.01)

(58) Field of Classification Search
CPC ........ B60K 11/085; B60K 11/08; B60K 11/04
(Continued)

(56) References Cited

U.S. PATENT DOCUMENTS 1,688,563 A * 10/1928 Tomlinson ................ E06B 9/90
160/301
3,945,453 A * 3/1976 Black ........................ B60K 6/10
185/11
(Continued)

FOREIGN PATENT DOCUMENTS

DE        1650655 U    2/1953
DE        3230116 A1   2/1984
(Continued)

OTHER PUBLICATIONS

Office Action for German Application No. 10 2019 106 826.6 dated Mar. 10, 2020, with its English translation, 20 pages.
(Continued)

*Primary Examiner* — Hau V Phan
(74) *Attorney, Agent, or Firm* — Peter W. Schroen; Bret E. Field; Bozicevic, Field & Francis LLP

(57) ABSTRACT

The invention relates to a device (2) for controlling and guiding a closure element (4) for closing a motor vehicle cooling module, comprising a first control element (10*a*) for controlling an opening and a closing movement of the closure element (4), a second control element (10*b*) for controlling an opening and a closing movement of the closure element (4), a guide element (8), which is arranged directly between the first and the second control element (10*a*, 10*b*), for guiding the closure element (4) during an opening and a closing movement, wherein the device (2) is formed in multiple parts and is assembled from parts produced separately from one another.

23 Claims, 13 Drawing Sheets

(58) Field of Classification Search
USPC ........................................................ 180/68.1
See application file for complete search history.

(56) References Cited

U.S. PATENT DOCUMENTS

| | | | | |
|---|---|---|---|---|
| 5,114,204 | A * | 5/1992 | Bernardo | B60N 2/6009 |
| | | | | 296/136.03 |
| 5,881,792 | A * | 3/1999 | Cheng | E06B 9/44 |
| | | | | 160/323.1 |
| 6,351,096 | B1 | 2/2002 | Jang | |
| 7,128,124 | B2 * | 10/2006 | Bibby | E06B 9/44 |
| | | | | 160/313 |
| 7,243,699 | B2 | 7/2007 | Ganser et al. | |
| 7,549,457 | B2 * | 6/2009 | Wieczorek | B60R 5/047 |
| | | | | 160/323.1 |
| 7,677,294 | B2 * | 3/2010 | Bohlen | E06B 9/50 |
| | | | | 160/323.1 |
| 9,067,480 | B2 * | 6/2015 | Wulms | B60J 7/085 |
| 10,030,439 | B2 * | 7/2018 | Smith | E06B 9/262 |
| 10,160,309 | B2 * | 12/2018 | Schwarz | B60K 11/085 |
| 10,329,995 | B1 * | 6/2019 | Larose, Jr. | F02M 31/20 |
| 2006/0000566 | A1 * | 1/2006 | Ganser | B60J 1/205 |
| | | | | 160/262 |
| 2011/0232865 | A1 | 9/2011 | Mildner | |
| 2012/0181001 | A1 * | 7/2012 | Marsh | F01P 3/20 |
| | | | | 165/185 |
| 2013/0247862 | A1 | 9/2013 | Sakai | |
| 2014/0014757 | A1 * | 1/2014 | Wulms | B60J 7/085 |
| | | | | 242/371 |
| 2015/0217633 | A1 * | 8/2015 | Huijzers | B60K 11/085 |
| | | | | 454/145 |
| 2016/0167907 | A1 | 6/2016 | Meyer | |
| 2016/0181837 | A1 * | 6/2016 | Shu | H02J 7/0018 |
| | | | | 320/119 |
| 2017/0341505 | A1 * | 11/2017 | Knauer | B60K 11/085 |
| 2018/0162683 | A1 * | 6/2018 | Munsters | B60J 1/2033 |
| 2018/0291682 | A1 * | 10/2018 | Walter-Seifart | E06B 9/68 |
| 2019/0009667 | A1 * | 1/2019 | Steffen | B60K 11/04 |

FOREIGN PATENT DOCUMENTS

| | | |
|---|---|---|
| DE | 102004030262 B3 | 4/2006 |
| DE | 202008002073 U1 | 7/2009 |
| DE | 102009043028 A1 | 3/2011 |
| DE | 102010012485 A1 | 9/2011 |
| DE | 102014109342 A1 | 1/2016 |
| DE | 102016123422 A1 | 6/2018 |
| DE | 102017211577 A1 | 1/2019 |
| DE | 102019106831 A1 | 9/2020 |
| EP | 2090736 A1 | 8/2009 |
| EP | 3031758 A1 | 6/2016 |
| JP | H5-69330 U | 9/1993 |

OTHER PUBLICATIONS

Office Action for German Application No. 10 2019 106 826.6 dated May 31, 2020, with its English translation, 13 pages.
International Preliminary Patentability Report for PCT Application No. PCT/EP2020/057295 dated Sep. 16, 2021, 9 pages.
Office Action for German Application No. 10 2019 009 284.8 dated Oct. 29, 2021, with its English translation, 10 pages.

* cited by examiner

DEVICE FOR CONTROLLING AND GUIDING A CLOSURE ELEMENT

BACKGROUND OF THE INVENTION

The present invention relates to a device for controlling and guiding a closure element for closing a motor vehicle cooling module, and to a system for closing a motor vehicle cooling module.

In modern vehicles, especially motor vehicles, fresh air flowing in through a radiator grille of the vehicle or through the openings of the radiator grille is channeled and directed onto a cooling module of the vehicle. In particular, said targeted channeling of the air flow onto the cooling module can ensure that, depending on the configuration of the cooling module, for example an engine of the vehicle and/or charge air for this engine can be efficiently cooled and/or the vehicle interior can be efficiently air-conditioned.

The air flow intake disadvantageously generates turbulent currents that counteract the movement of the vehicles concerned and lead to reduced ranges or increased fuel consumption. To solve this problem, prior art closure systems are known which can close the air intakes located inside the engine compartment as required and thus reduce the generation of turbulent flows. Devices for controlling and guiding the closure elements of such closure systems are known from the prior art. In this context, the known devices are configured in the form of one-piece components, which are generally produced via an injection molding process with an integrated gas injection or water injection as well as a supplementary projectile injection. The disadvantage is that the processes for producing such devices are technically very complex and costly and time-consuming.

It is therefore the object of the present invention to at least partially eliminate the above-mentioned disadvantages of known devices for controlling and guiding closure elements for closure systems. In particular, it is the object of the invention to provide a device for controlling and guiding a closure element for closing a motor vehicle cooling module, which can be produced in a simple, fast and inexpensive manner.

BRIEF SUMMARY OF THE INVENTION

The above object is solved by a device with the features of the independent device claim and a system with the features of the independent system claim. Further features and details of the invention result from the respective dependent claims, description and the drawings. Features and details described in connection with the device according to the invention naturally also apply in connection with the system according to the invention and vice versa in each case, so that reference is or can always be made mutually with regard to the disclosure of the individual aspects of the invention.

According to the invention, a device for controlling and guiding a closure element for closing a motor vehicle cooling module is provided, which comprises a first control element for controlling an opening and a closing movement of the closure element, a second control element for controlling an opening and a closing movement of the closure element, and a guide element arranged directly between the first and the second control element for guiding the closure element during an opening and a closing movement. In accordance with the invention, the device is configured in multiple parts and is composed of parts produced separately from one another.

The present device for controlling and guiding a closure element can preferably be arranged together with a closure element in the front area of a motor vehicle, in particular between a radiator grille or a front hood and a motor vehicle cooling module. In addition to being used in passenger cars and trucks, the device according to the invention can likewise be used in other motorized vehicles, such as ships or flying objects or the like. Preferably, an opening operation and a closing operation of a closure element can be performed by an interaction between the subject control elements and the guide element according to the invention together with a closure element to close or open air inlets arranged along a vehicle height. Such air inlets may be configured, for example, in the form of brake air ducts or supply air ducts for the engine compartment or for an air conditioning system or the like. According to the invention, a multi-part device is understood to mean a device which comprises components which can be separated from one another. In the present case, these separable components are at least a first and a second control element and a guide element arranged directly between the control elements, all of which can be produced separately from one another and, after production, are assembled to form the device according to the invention.

Within the scope of the invention, it has been recognized that a production process can be greatly simplified, accelerated and carried out more cost-effectively by breaking down a one-piece component into a multi-part component configured from separately producible parts.

With regard to a space-saving and compact arrangement as well as a simultaneously effective and low-wear guidance of the closure element during an opening and a closing movement, it can be advantageously provided within the scope of the invention that the guide element is configured in the form of a winding shaft onto which the closure element can be wound during an opening movement and from which the closure element can be unwound during a closing movement.

In the context of simple and cost-effective production, in particular for mass production, it can also be provided in accordance with the invention that the guide element is configured in the form of an extruded profile, preferably in the form of an extruded hollow profile. By means of common extrusion processes, even complex hollow profile-shaped structures can be produced in a single step.

To ensure a simple, compact and material-saving connection between the guide element in question and the control elements according to the invention, it is particularly advantageous if the guide element has two recesses arranged on the outer surfaces to accommodate the control elements. The recesses can already be introduced into the guide element in the form of an extruded profile or they can be created by additional machining of the guide element.

In order to ensure a connection that is as simple and uncomplicated as possible between a guide element and the control elements with, at the same time, the greatest possible freedom of adjustment, it can also be provided in accordance with the invention that the recesses arranged on the outer surfaces of the guide element are point-symmetrical, the point of symmetry preferably simultaneously forming the center of the cross-sectional area of the guide element. For example, star-shaped structures, circular structures or regular n-cornered structures can be provided as point-symmetrical structures. The point-symmetrical shape ensures the greatest possible freedom with regard to the alignment of the control elements to the guide element, in particular when producing a form fitting connection between the guide element and the control elements.

As part of a particularly simple type of connection between the guide element and the control elements, it can also be provided in particular that the recesses arranged on the outer surfaces are configured to correspond in shape to the external shape of a connection area of the control elements. In this way, for example, crimp or press connections can be generated in a simple manner, with the external shape of the control elements preferably forming the geometry for pressing in.

Within the scope of a structurally simple and reliable fastening of a closure element to the guide element according to the invention, it can be advantageously provided that the guide element has a graduated adhesive surface arranged on the outer surface for the material-locking fastening of a closure element, the adhesive surface preferably being continuous, in particular comprising at least 3% of the total circumferential surface of the guide element. With regard to reliable fastening, the adhesive surface can also comprise more than 3%, preferably at least 5%, in particular at least 10% of the total circumferential surface of the guide element.

With regard to an effective prevention of faulty constructions during the assembly of the present guide element with the control elements according to the invention, it can furthermore be advantageously provided that the guide element and/or the control elements have adjustment means for ensuring a correct connection between the guide element and the control elements, wherein the adjustment means of the guide element are preferably only arranged in a correct positioning of the guide element to the control elements corresponding in shape to the adjustment means of the control elements. In this way, in particular, a correct connection between the guide element and the control elements is ensured with regard to an exact position or an exact connection angle or the like. In the simplest case, the adjustment means can be configured in the form of positioning pins and shape-corresponding recesses or the like. Alternatively or additionally, a correct positioning can also be indicated by appropriately positioned markings or the like.

Within the scope of a structurally simple execution of the prevention of faulty constructions and a guarantee of a simple and correct assembly, it can be provided objectively in particular that the adjustment means are configured in the form of ribs and corresponding recesses, wherein the ribs are preferably arranged within the guide element and the recesses are arranged within the first and second control element, in particular within the connecting area of the first and second control element.

To prevent an incorrect assembly, according to the invention, it can further be provided that the guide element has flattened surface areas along its inner surface, wherein preferably at least two flattened surface areas are arranged along the circumference of the guide element, wherein the two surface areas are arranged in particular asymmetrically with respect to each other. The flattened surface areas can thereby cooperate in particular in combination with other elements or means arranged along the inner surface of the guide element or along the outer surface of the control elements, in particular the adjustment means, in order to ensure correct positioning of the guide element during assembly with the first and second control elements. In this regard, the asymmetrical arrangement according to the invention is intended to generate, in particular, a poke-yoke safeguard for exact circulation positioning.

Within the framework of a particularly simple and, in particular, reversible form of connection of a guide element to control elements, it can also be provided in accordance with the invention that the control elements are form fittingly connected to the guide element, the control elements and/or the guide element preferably comprising at least one form fitting connection means. The form fitting connection between the control elements and the guide element can be configured in particular in the form of a press connection. Preferably, expanding rivets, locating pins or retaining rings or the like can be used as form fitting connection means, which, in addition to their function of generating a form fitting connection, can also serve to prevent faulty constructions when assembling the guide element in question with the control elements according to the invention.

With regard to a particularly lightweight configuration of the device according to the invention, it may further be provided that the guide element is configured from a lightweight material having a density of less than 3 g/cm$^3$, the lightweight material being in particular an aluminum material and/or a plastic.

However, in order to create a stable and low-wear configuration at the same time, in which the control elements can be pressed into the present guide element without any problems, it is advantageous if the control elements are configured from a hard metal material, preferably from a ferrous material, in particular from steel.

Also with regard to a space-saving and compact arrangement as well as a simultaneously precise, effective and low-wear control of the closure element during an opening and a closing movement, it can be provided within the scope of the invention that the first and second control elements each comprise a shaft and a respective cable pull arranged on the shaft, the first cable pull being connected to the first control element and the second cable pull being connected to the second control element. In addition, both cable pulls are preferably connected to the guide element, or can be connected to a closure element that can be arranged on the guide element, so that the control elements can unwind the closure element from the guide element or wind the closure element onto the guide element with the aid of the cable pulls. The first and second cable pulls can preferably be configured in the form of thin and stable wires, in particular in the form of fine cables made of stainless steel or the like.

In the context of a particularly stable and robust configuration, the cable pulls can also be configured in the form of Bowden cables or the like.

With regard to the most constant possible tensile stress on the closure element during an opening and a closing process, it can also be provided in accordance with the invention that the first and second control elements have conically shaped partial areas in order to compensate for a diameter increase and a diameter decrease of the guide element due to the winding and unwinding of the closure element. The conically shaped sections can preferably be provided with threads for guiding or for controlled winding and unwinding of the cable pulls. Constant pre-tensioning is particularly important in order to prevent "fluttering" of the closure element in the airstream and the formation of creases or the like, and thus to ensure clean winding. When the closure element is wound onto the guide element, the diameter of the guide element increases, whereas it decreases when the closure element is unwound. By means of an appropriately configured and positioned conical shape, this increase and decrease can be compensated so that a constant tensile stress is ensured during a complete opening and closing process. With regard to a structurally simple configuration, the conical sections are preferably arranged in such a way that the diameter increases towards the outer surface, i.e. in the opposite direction to the connection point of the control elements with the guide element in question. Since the radius of the control elements should advantageously be adapted with each layer of wound-on closure element, the configuration or intensity of the conification depends, among other things, on the layer thickness of the closure element. The shape of the tapered sections, i.e. in particular the optimum radius in relation to the respective winding number, can be approximated by taking into account the fabric winding radius of the guide element, twice the closure element thickness, the corresponding winding number and a specific conversion factor.

With regard to a preferably constant tensile stress on the closure element during an opening and a closing process, it is also conceivable that the first and second control elements have variably shaped partial areas in order to compensate for a diameter increase and diameter decrease of the guide element caused by the winding and unwinding of the closure element, wherein the variably shaped partial areas preferably have a thread, wherein the thread in particular has differently shaped thread sections. In this case, the different thread sections can preferably have different cross-sectional areas, which can be arranged one after the other in the longitudinal direction, parallel to the arrangement of the guide element.

Within the framework of a simple and exact calculation to ensure a tension on the closure element that is as constant as possible during an opening and a closing process, it is conceivable in particular that the thread sections are configured in the form of regular n-polygons, the number n of n-polygons preferably decreasing or increasing continuously from one end to the other of the control elements. The thread sections are configured in particular along their cross-sectional areas in the form of regular n-polygons, wherein an ideally circular thread section can be regarded in particular as the largest possible number $n=\infty$. For example, a variably shaped portion may be shaped such that a circular threaded portion is arranged on the first side of the control element, followed, for example, by a regular nonagon, followed by a threaded portion configured in the shape of a regular hexagon. The threaded section configured in the shape of a regular hexagon may then be followed, for example, by a section configured in the shape of a regular pentagon, a section configured in the shape of a regular quadrilateral, and a threaded section configured in the shape of a regular triangle. The shapes of the threaded sections can also be calculated or approximated in this case—as in the case of an embodiment with conically shaped sections—whereby the circumference of an n-polygon can be determined, in particular, via the value n and the diameter of the polygon with $n=\infty$. The determined circumference can then advantageously be related to the diameter increase and diameter decrease due to the unwinding or winding of the closure element.

Within the framework of the most stable and durable configuration possible of an object device for controlling and guiding a closure element, it can be advantageously provided in accordance with the invention that at least two bearings are provided for mounting the device on a frame or a part of a motor vehicle, the bearings preferably being arranged at least partially between the guide element and the first and second control elements. An arrangement in which the bearings are arranged between the guide element and the first and second control elements minimizes in particular the load at load-critical points, such as the fastening means or the pins, and thus enables a more balanced load on the device according to the invention, which leads to less deflection. In such an arrangement, it is possible, for example, to replace cost-intensive ball bearings with simpler bearings.

In the context of a particularly stable arrangement, it may also be provided that at least four bearings are provided for mounting the device on a frame, the bearings preferably being arranged at least partially between the guide element and the first and second control elements and at the end on the fastening means of the first and second control elements.

With regard to a stable and reliable fastening of the guide element to the present control elements, it can be further provided according to the invention that the first and/or second control element have receiving areas for receiving the bearings, the receiving areas preferably being arranged between the conically shaped partial areas and the connecting areas, the receiving areas in particular surrounding the entire circumference of the first and/or second control element.

To prevent weakening of the connection due to the removal of material when the control elements are inserted into the recesses of the guide element, it is further conceivable for the first and/or second control element to have a recess for receiving removed material, the recess preferably being arranged at the end of the connection area, adjacent to the conically shaped partial areas, the recess surrounding the first and/or second control element in particular over the entire circumference.

With regard to a reinforced connection between the guide element and the control elements, it is furthermore also conceivable that the first and/or second control element has a clearance for receiving center marks, the clearance preferably being configured in the form of a groove-like recess which, in particular, runs essentially parallel to the thread of the conically shaped partial areas. In this case, in particular, a plurality of clearances, at least two clearances, can be provided for receiving center marks. The center marks can then be created during assembly, after insertion of the control elements into the guide element, by pressing or the like against the guide element.

In the context of a material-conserving assembly, in particular in the context of a material-conserving insertion of the control elements into the guide element, it can be provided in accordance with the invention in particular that the first and/or second control element has a bevel to facilitate an insertion of the control elements into the recesses of the guide element, the bevel being arranged at the end inside the connecting area, the bevel surrounding the first and/or second control element in particular over the entire circumference.

In the context of a particularly firm, in particular gap-free and wobble-free connection between the guide element and the control elements, it can be objectively advantageous if the first and/or second control element has an excessive adapting surface for at least partial deformation during assembly, wherein the first and/or second control element can be pressed via the excessive adapting surfaces within the recesses of the guide element. In this way, the control elements can be at least partially pressed together and deformed during an insertion into the recesses of the guide element, so that a gap-free and wobble-free connection can be generated.

It is also an object of the invention to provide a system for closing a motor vehicle cooling module. The system in question comprises a device described above for controlling and guiding a closure element as well as a closure element for closing a motor vehicle cooling module. Thus, the system according to the invention brings the same advantages as have already been described in detail with respect to the device according to the invention.

With regard to a particularly lightweight configuration and an opening and closing process that is at the same time simple and gentle on the material, it can be provided in accordance with the invention in particular that the closure element is configured in the form of a textile. In order to ensure the most effective possible shielding of an air flow, the closure element is here preferably configured in the form of an at least partially air-impermeable textile, which is preferably configured from a synthetic material which is as tear-resistant as possible, such as for example a polyester or a polyamide or the like. The closure element may also be provided with an at least partially air-impermeable coating or the like. Preferably, the closure element further has a dirt-repellent surface, or is provided with a dirt-repellent coating or the like. With regard to a simple and flexible guidance of the closure element during an opening and a closing movement, the closure element can furthermore advantageously have a fabric thickness of 0.15 to 0.3 mm, in particular a fabric thickness of 0.25 mm.

With regard to a structurally simple introduction and control of a closure element via two control elements, it can also be advantageously provided in accordance with the invention that the guide element is arranged between the first and second control elements in such a way that the main alignment axis of the guide element is aligned essentially perpendicular to an opening and closing movement of the closure element.

With regard to a simple and compact arrangement as well as a simultaneously precise and effective control of the closure element during an opening and a closing movement, it may further be provided within the scope of the invention that the control elements are connected to the closure element via the first and second cable pull, the connection preferably being configured such that the cable pulls are wound onto the control elements during an opening movement and are unwound from the control elements during a closing movement.

In order to ensure remotely controllable opening and closing of a closure element, it is further advantageous if a guide means is provided for guiding the control element. Here, the guide means can preferably be configured in the form of an actuator, in particular in the form of a rotary actuator.

With regard to an automated adaptation of the positioning of the device according to the invention to determinable variables, such as a current speed, a current consumption, a current outside temperature, a current engine temperature, a current brake load, a current tank filling or the like, it can further be advantageously provided that a detection unit is provided for acquiring data for determining a current position of the closure element with respect to a vehicle height and/or a current temperature and/or a current tensile stress and/or a current speed and/or a current energy consumption. Preferably, it may be provided in the context of the invention that the detection unit comprises at least one sensor for detecting said data. In the context of a compact and easily replaceable and integrable embodiment, it may be particularly advantageous if the detection unit is arranged in the device according to the invention for locking a motor vehicle. Alternatively, the detection unit can also be arranged remotely from the device and preferably integrated in a control unit or the like. With regard to an automatable adaptation of a positioning of the device according to the invention, an interaction of sensors of the detection unit with sensors arranged within a vehicle can thereby advantageously take place in particular, so that already existing sensor technology can be used in a simple manner.

With regard to a particularly exact determination or a control of a positioning of the device according to the invention that is as precisely controllable as possible, it can be advantageously further provided that a processing unit is provided for sending a control command to the guide means on the basis of the acquired data. The processing unit is advantageously able to process data on the basis of several sensors, for example to average, weight or the like, in order to additionally increase the informative value of the data before a control command is issued to the guide means on the basis of the processing. For smooth control and communication of the individual components, such as the detection unit, the processing unit and the various sensors with each other, the components can preferably be connected to each other by means of a communication and control cable within the scope of a wired configuration. With regard to a particularly flexible, uncomplicated and efficient communication of the individual system units, the individual components can preferably communicate with each other wirelessly or contactlessly on a server or cloud basis and/or via the Internet.

Also, an object of the invention is a motor vehicle comprising a device described above for controlling and guiding a closure element, in particular comprising a system described above for closing a motor vehicle cooling module.

Further advantages, features and details of the invention will be apparent from the following description, in which embodiments of the invention are described in detail with reference to the drawings. In this connection, the features mentioned in the claims and in the description may each be essential to the invention individually or in any combination.

DETAILED DESCRIPTION OF THE INVENTION

Figure 1:
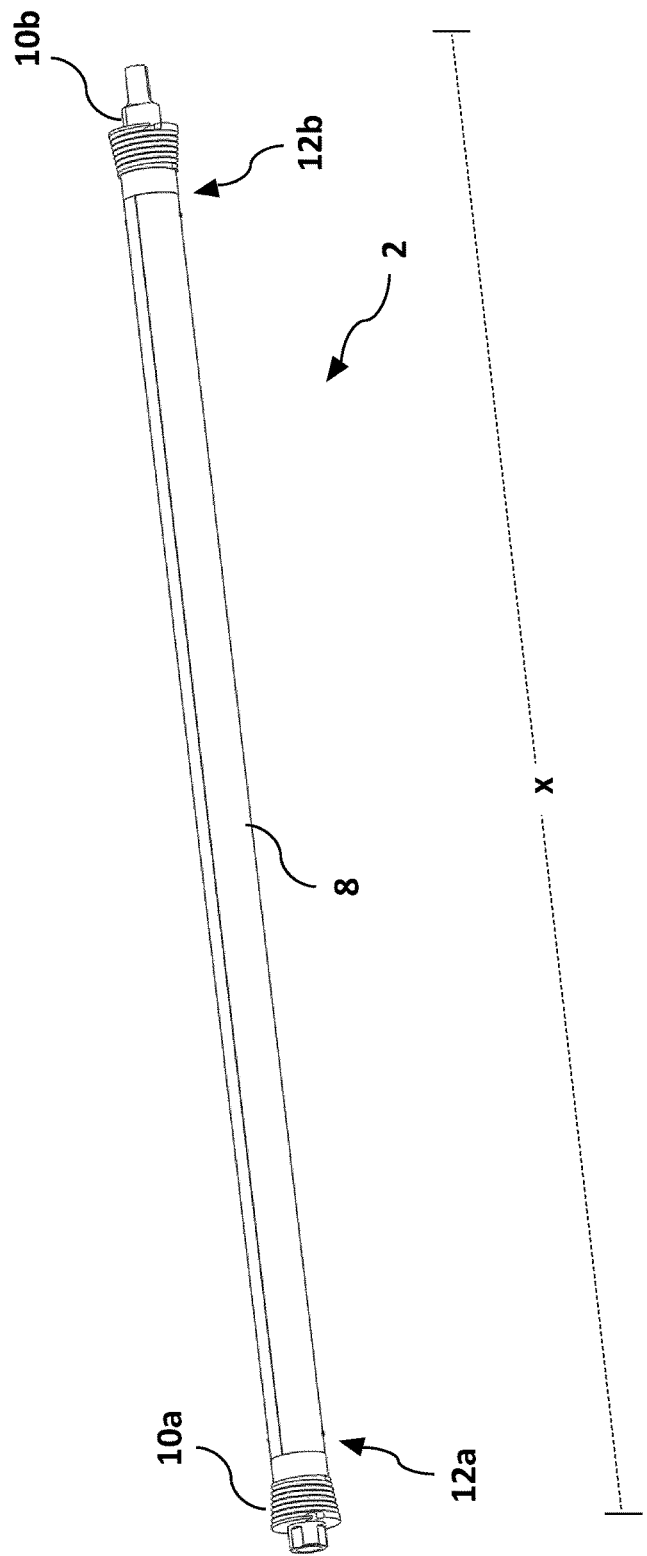
FIG. 1 a schematic representation of a device according to the invention for controlling and guiding a closure element for closing a motor vehicle cooling module according to a first embodiment, FIG. 2 a schematic representation of a part of a guide means according to the invention in an enlarged view according to a first embodiment, FIG. 3 a schematic representation of a first control element according to the invention in an enlarged view according to a first embodiment, FIG. 4 a schematic representation of a second control element according to the invention in an enlarged view according to a first embodiment, FIG. 5 a schematic representation of a second control element according to the invention together with a part of a guide means according to the invention in accordance with a first embodiment, FIG. 6 a schematic representation of a part of the first control element according to the invention in an enlarged representation according to a first embodiment (a) and a representation of the first control element according to the invention in an enlarged representation according to a second embodiment together with an associated first guide element (b), FIG. 7 a schematic representation of the possibility of mounting the device according to the invention for controlling and guiding a closure element over the first conically shaped portion according to a first embodiment (a), a second embodiment (b) and a third embodiment (c), FIG. 8 another schematic illustration of the possibility of mounting the device according to the invention for controlling and guiding a closure element over the first and second conically shaped portions according to a second embodiment (top) and a third embodiment (bottom), FIG. 9 a schematic representation of the first control element of the device according to the invention for controlling and guiding a closure element in a detailed representation according to a first embodiment, FIG. 10 a schematic representation of the guide element according to the invention for guiding a closure element in a spatial representation (a) and a sectional representation according to a section along section line I-I from FIG. 10a, FIG. 11 a schematic representation of a part of the device according to the invention for controlling and guiding a closure element in a sectional view in the form of a longitudinal section according to a first embodiment, FIG. 12 a schematic representation of the device according to the invention for controlling and guiding a closure element according to a sectional view along sectional line I-I (a) and along sectional line II-II (b) of FIG. 11.

FIG. 1 shows a schematic representation of a device 2 according to the invention for controlling and guiding a closure element 4 for closing a motor vehicle cooling module according to a first embodiment. In this case, the device 2 comprises a first control element 10a for controlling an opening and a closing movement of the closure element 4, a second control element 10b for controlling an opening and a closing movement of the closure element 4, and a guide element 8, arranged directly between the first and the second control element 10a, 10b, for guiding the closure element 4 during an opening and a closing movement, the device 2 being configured in multiple parts and being composed of parts produced separately from one another. The guide element 8 is configured in the present case in the form of a winding shaft onto which the closure element 4, which can preferably be configured in the form of a textile or the like, can be unwound during an opening movement and from which the closure element 4 can be unwound during a closing movement. The guide element 8 can in this case preferably be configured in the form of an extruded profile, in particular in the form of an extruded hollow profile or the like, and further comprises two recesses 16a, 16b arranged on the outer surfaces 12a, 12b for receiving the control elements 10a, 10b. In the present case, the guide element 8 is arranged between the first and second control elements 10a, 10b in such a way that the main alignment axis X of the guide element 8 is aligned substantially perpendicular to an opening and closing movement of the closure element 4.

Figure 2:
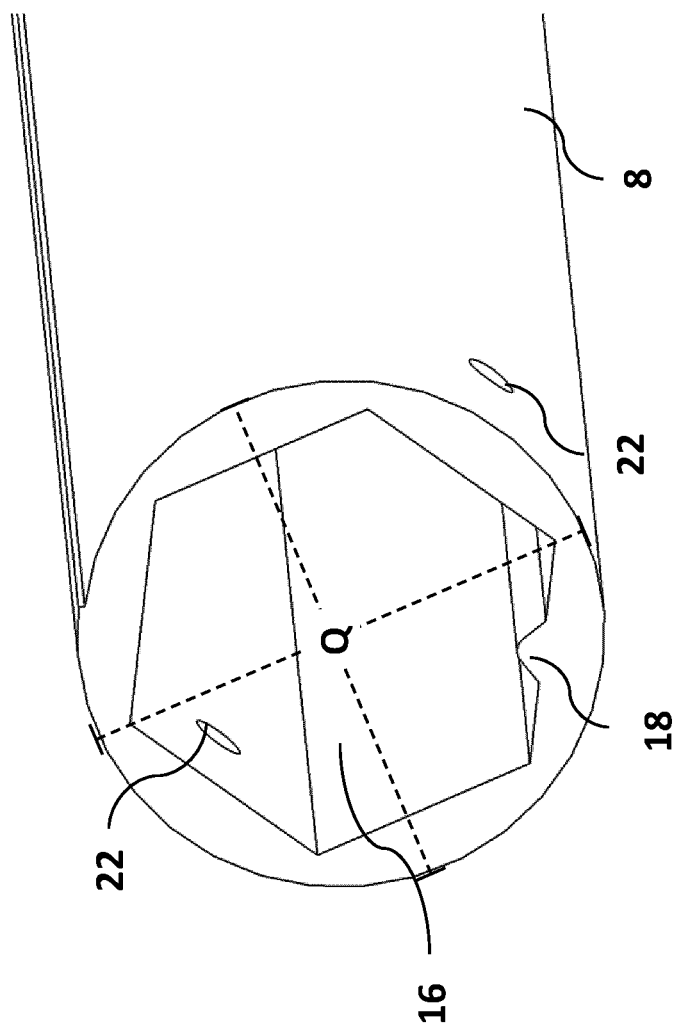

FIG. 2 shows a schematic representation of a part of a guide element 8 according to the invention in an enlarged view according to a first embodiment.

According to this first embodiment, the guide element 8 comprises a recess 16 arranged on the outer surface 12a of the guide element 8, which recess 16 is presently configured point-symmetrically, the point of symmetry simultaneously forming the center of the cross-sectional area Q of the guide element 8. In the present case, the guide element 8 further comprises two form fitting locking connecting means 22 configured opposite one another in the form of recesses, which are preferably configured for the introduction of pins or the like corresponding in shape. Furthermore, the guide element 8 has an adjustment means 18 configured in the form of a positioning pin for ensuring a correct connection between the guide element 8 and the control elements 10a, 10b. The adjustment means 18 of the guide element 8 are preferably configured in such a way that they are preferably only arranged in a correct positioning of the guide element 8 with respect to the control elements 10a, 10b in a form corresponding to the adjustment means 18 of the control elements 10a, 10b.

Figure 3:
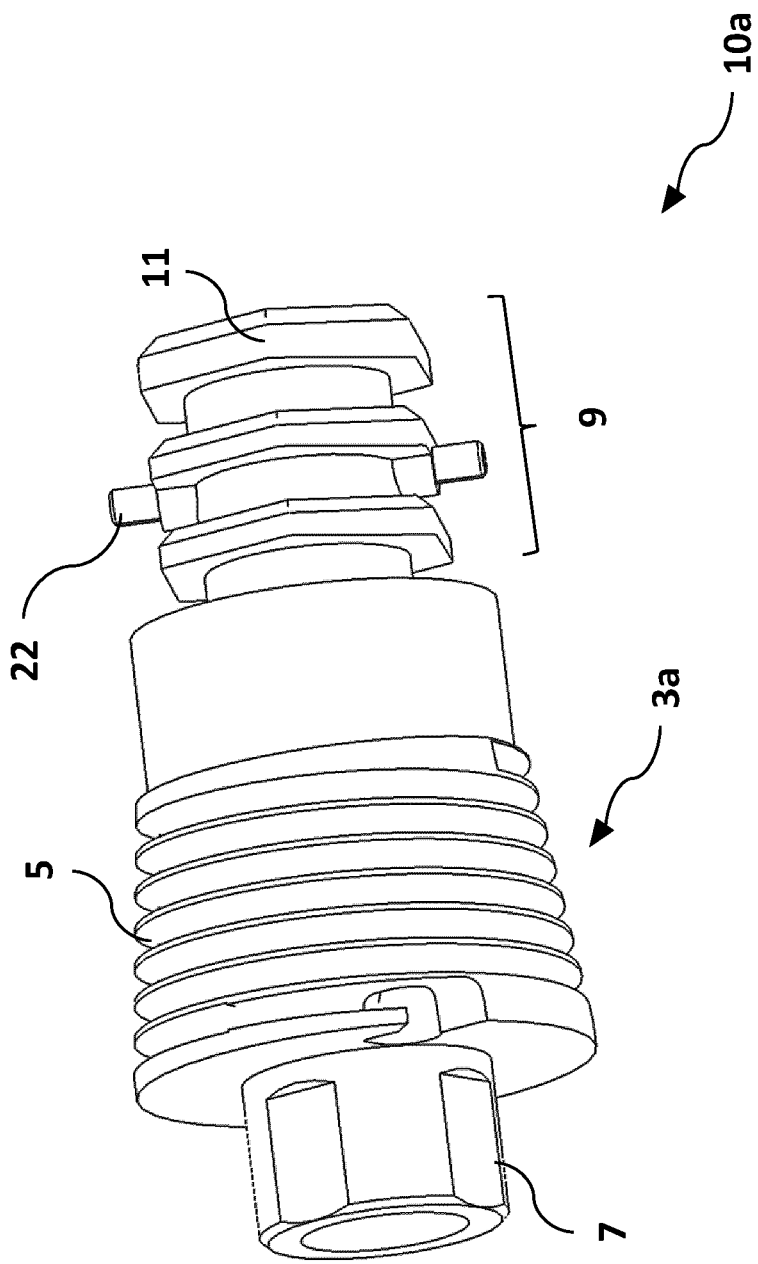

FIG. 3 shows a schematic representation of a first control element 10a according to the invention in an enlarged view according to a first embodiment.

The first control element 10a essentially comprises a first connecting area 9 for connection to a guide element 8, an adjoining conically shaped partial area 3a, and a fastening element 7 arranged on the conically shaped partial area 3a for fastening the device 2 in a motor vehicle front area. The conically shaped partial area 3a fulfills the purpose of compensating for the increase and decrease in diameter of the guide element 8 caused by the winding and unwinding of the closure element 4. When the closure element 4 is wound onto the guide element 8, the diameter of the guide element 8 increases, whereas it decreases when the closure element 4 is unwound, so that the conical shape, if appropriately configured and arranged, can compensate for the increase and decrease and thus provide a constant pretension during an opening operation and a closing operation. Within the conical shaped portion 3a, a thread 5 is further provided for insertion of a cable 10a. Within the connecting area 9, moreover, form fitting connecting means 22 configured in the form of pins are provided, which ensure a form fitting connection with the guide element 8 via a form fitting engagement in the recesses 22 shown above. Furthermore, the connecting area 9 has an external shape 11 configured in a form corresponding to the recess 16 of the guide element 8, which in the present case preferably forms the geometry for press-fitting and thus enables a crimping or press-fit connection between the control element 10a and the guide element 8.

Figure 4:
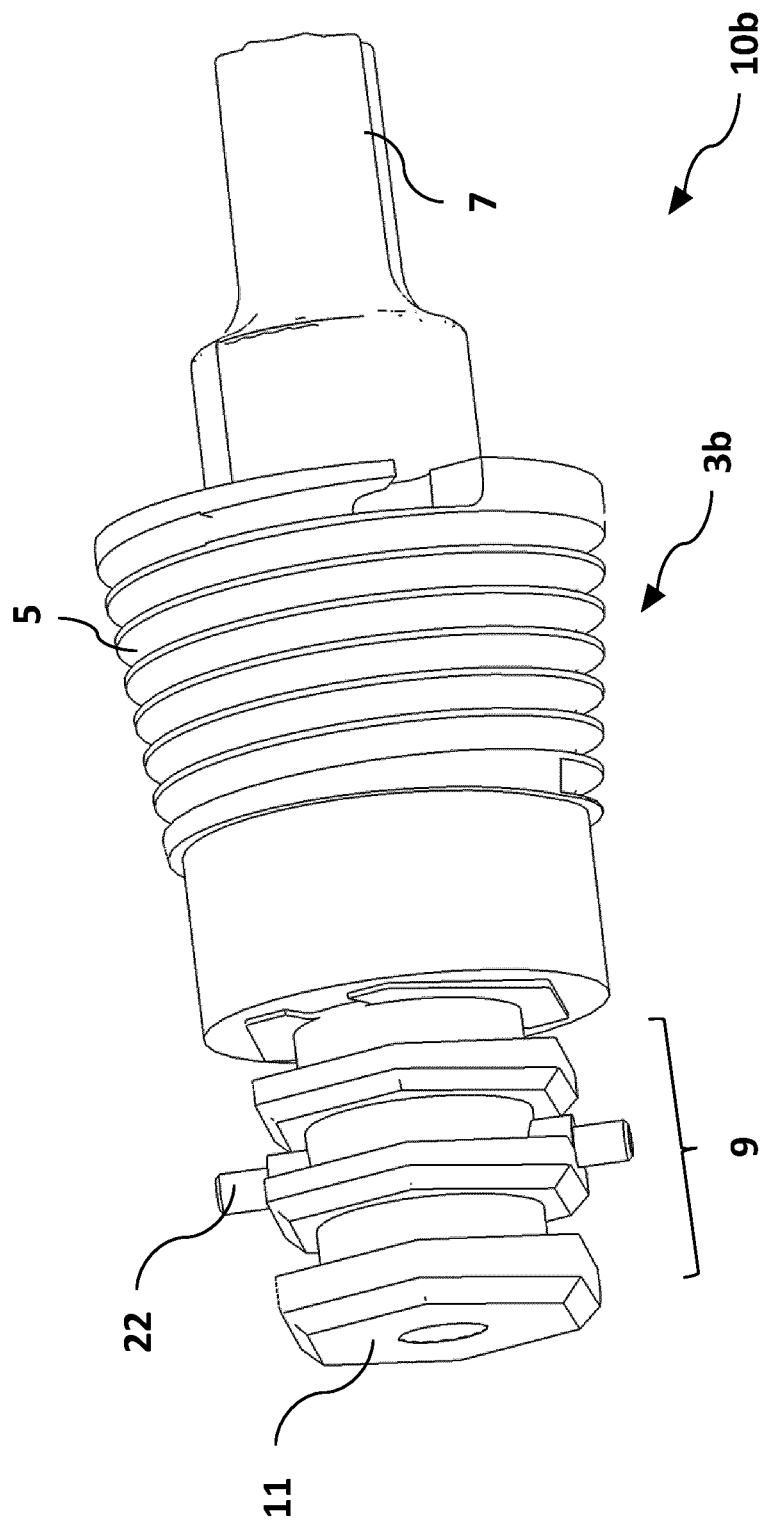

FIG. 4 shows a schematic representation of a second control element 10b according to the invention in an enlarged view according to a first embodiment.

The second control element 10b shown also comprises a first connecting area 9, a conically shaped partial area 3b and a connecting means 7 arranged on this partial area 3b. The conically shaped partial area 3b furthermore also comprises a thread 5. The connecting area 9 furthermore also comprises form fitting connecting means 22 configured in the form of pins and an external shape 11 configured in a form corresponding to the recesses 16.

Figure 5:
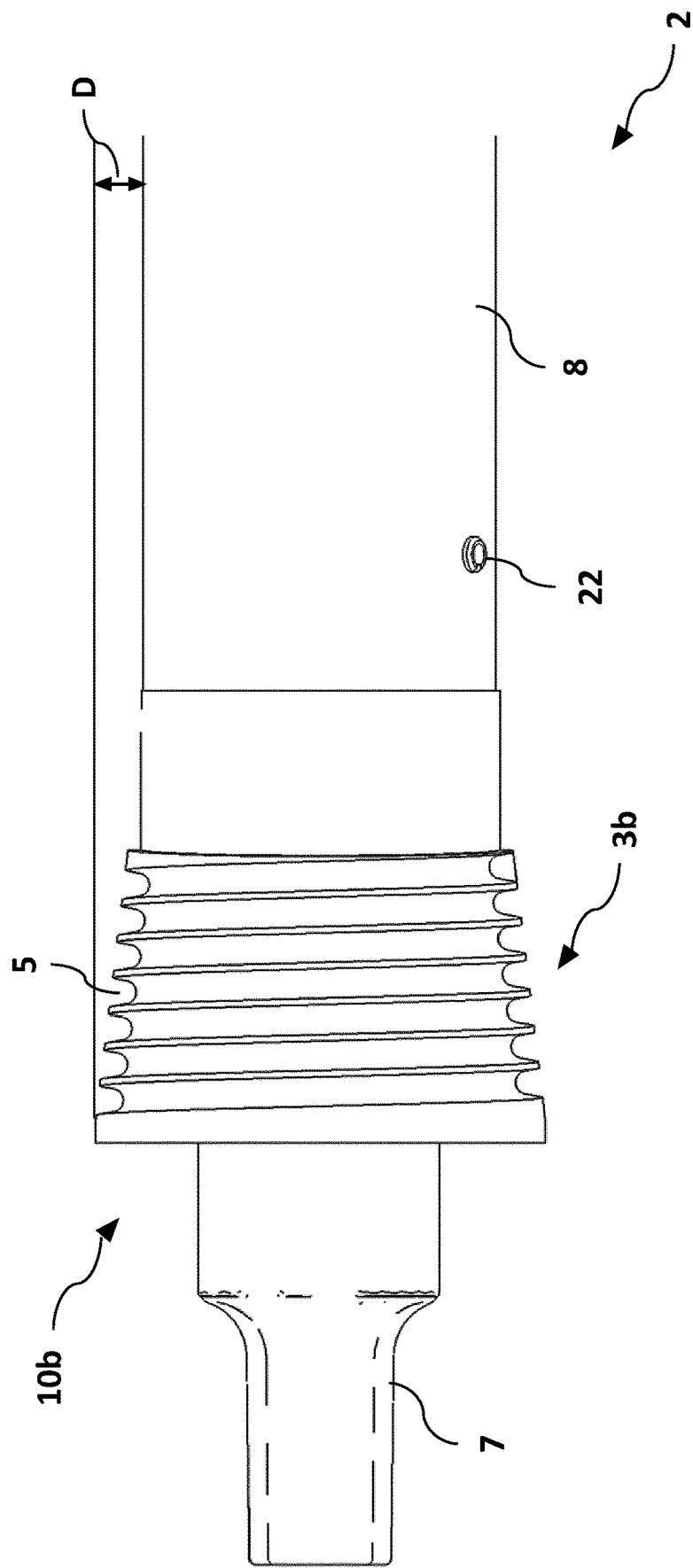

FIG. 5 shows a schematic representation of a second control element 10b according to the invention together with a part of a guide element 8 according to the invention, whereby the function of the conically shaped partial area 3b, namely the compensation of the increase and decrease in diameter D caused by the winding and unwinding of the closure element 4, is explained, which ensures that a constant tensile stress is preferably ensured during a complete opening or closing process.

Figure 6A:
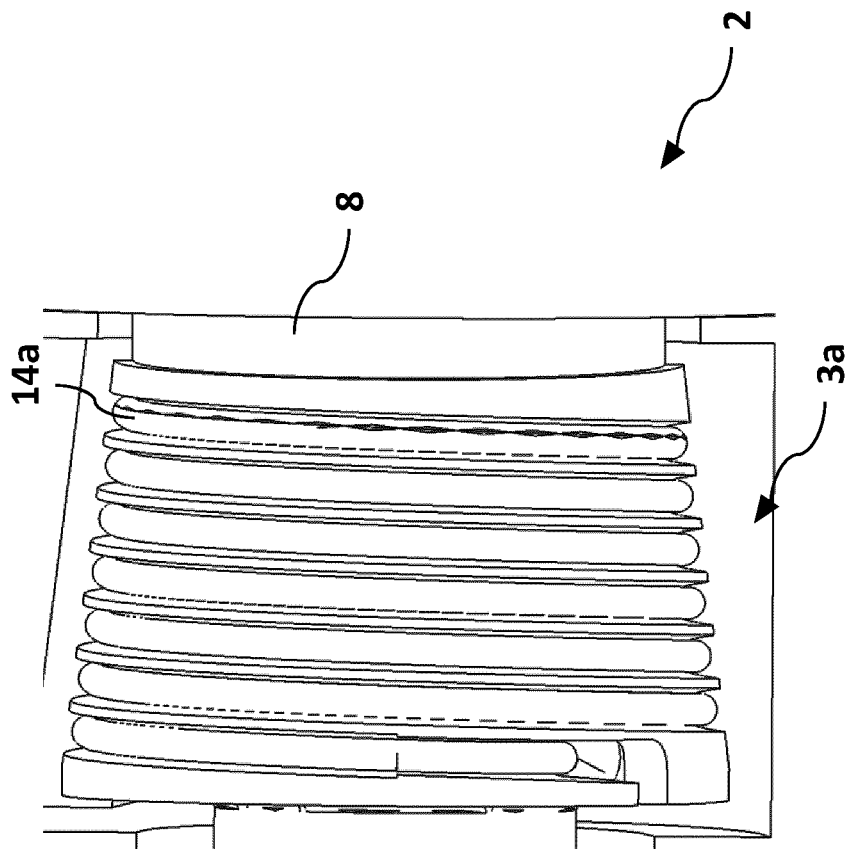

FIG. 6a shows a schematic representation of a part of the first control element 10a according to the invention in an enlarged view. According to FIG. 6a, furthermore, the winding of the cable 14a within the thread 5 of the conically shaped partial area 3a is shown.

Figure 6B:
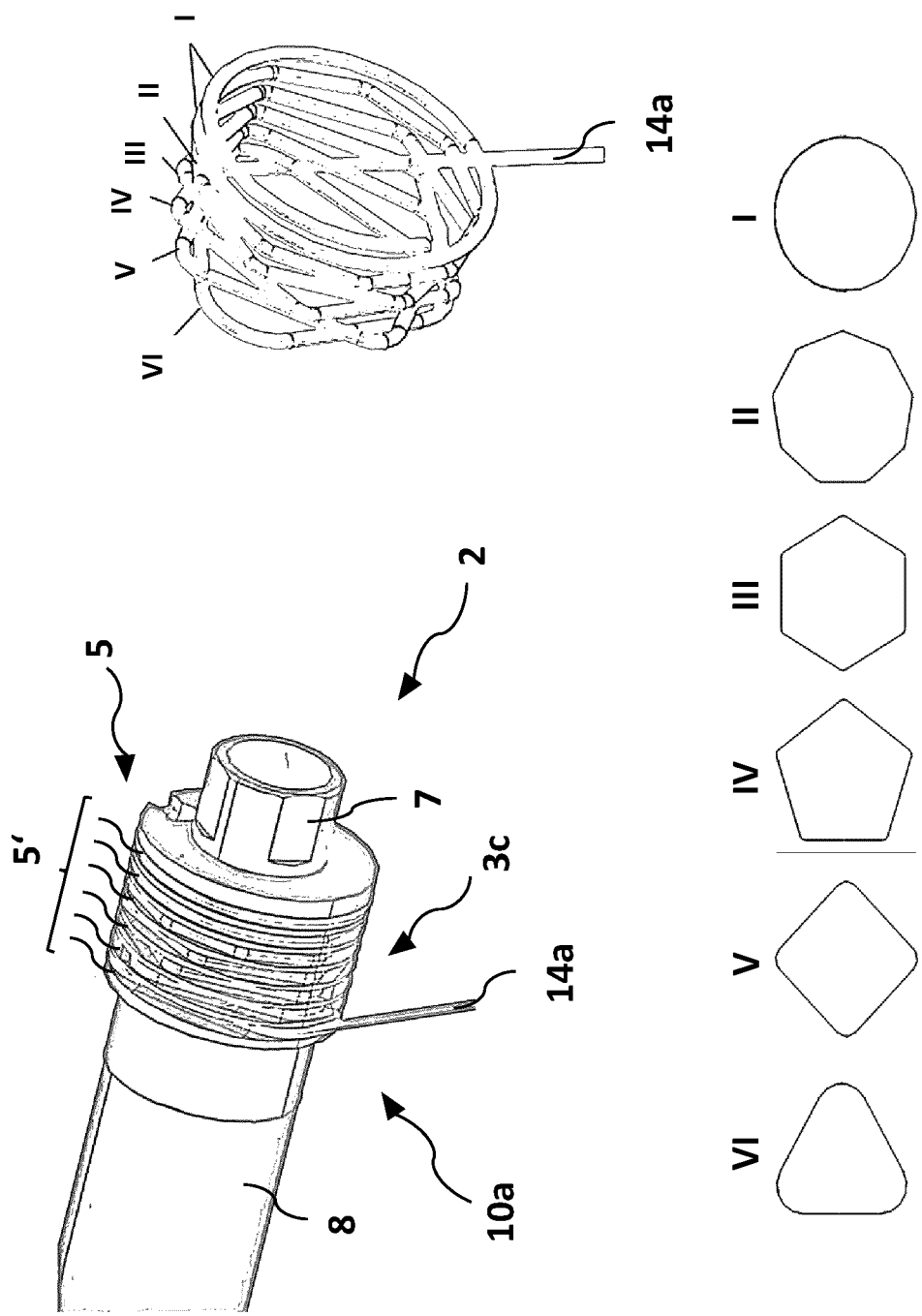

FIG. 6b shows a representation of the first control element 10a according to the invention in an enlarged view according to a second embodiment together with an associated first guide element 14a. According to this second embodiment, the first control element 10a has a variably shaped portion 3c to compensate for a diameter increase and diameter decrease of the guide element 8 caused by the winding and unwinding of the closure element 4, wherein the variably shaped partial portion 3c has a thread 5 comprising differently shaped thread portions 5'. In this case, the different thread sections 5' have different cross-sectional areas, which are arranged in succession in the longitudinal direction, parallel to the arrangement of the guide element 8. The thread sections 5' are configured in the present case in the form of the regular n-polygons shown below in FIG. 6b, the number n of n-polygons preferably decreasing continuously from the outer end of the control element 10a towards the inner end. The ideally circular threaded section 5' arranged at the outer most surface is regarded as a polygon with the largest possible number n=∞. Thus, the variably shaped portion 3c shown according to FIG. 6b is shaped in such a way that a circular I threaded portion 5' is arranged on the outer surface of the control element 10a, followed by a regular nonagon portion II, followed by a threaded portion 5' configured in the shape of a regular hexagon III. The threaded section 5' configured in the shape of a regular hexagon III is then followed by a section 5' configured in the shape of a regular pentagon IV, a section 5' configured in the shape of a regular quadrilateral V, and a threaded section 5' configured in the shape of a regular triangle VI. Next to the first control element 10a, a correspondingly wound first guide element 14a is further shown, with the numbering of the correspondingly shaped threaded sections 5' of the associated first control element 10a.

Figure 7:
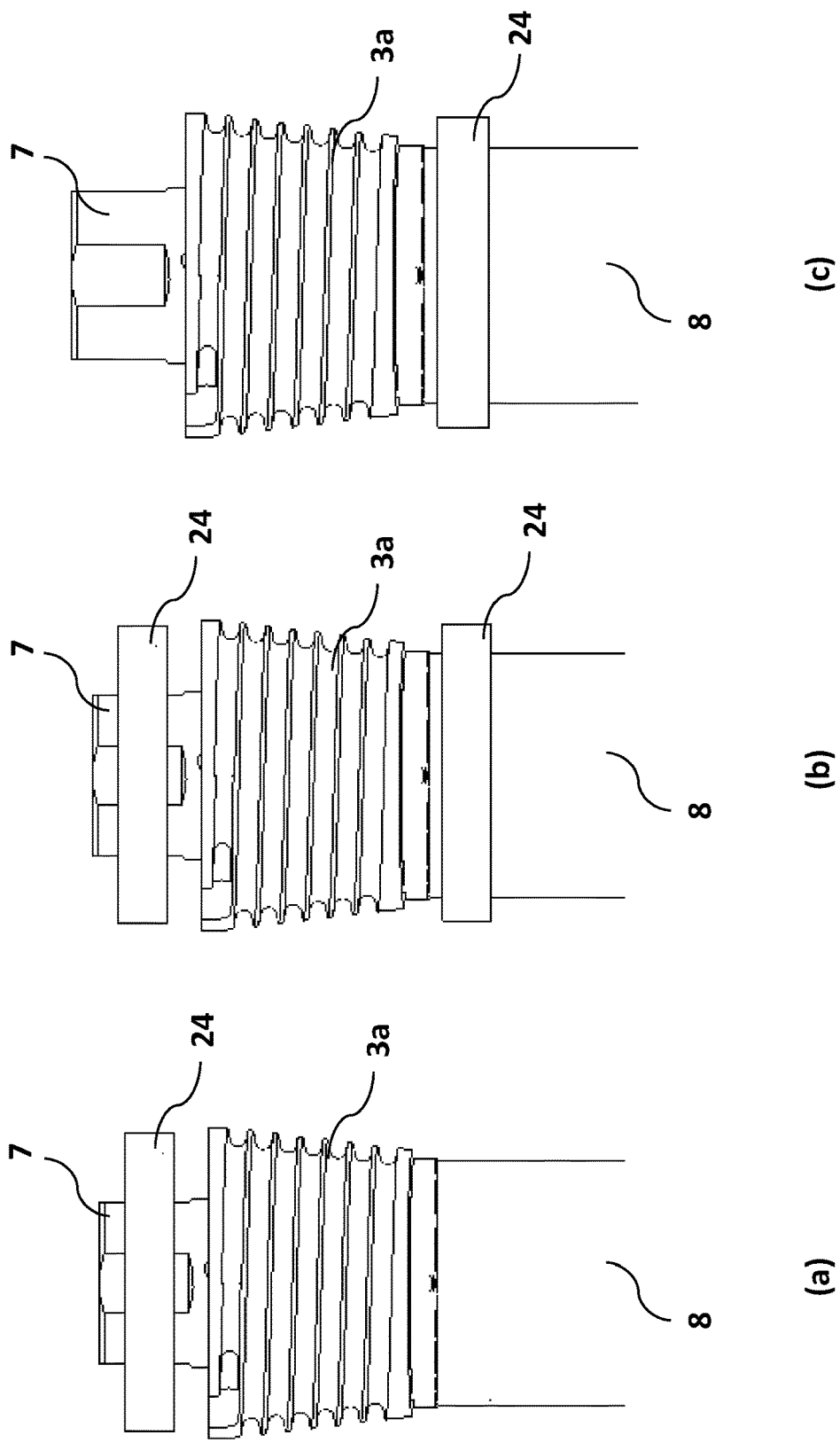

FIG. 7 shows a schematic representation of the possibility of mounting the device 2 according to the invention for controlling and guiding a closure element 4 via the first conically shaped portion 3a.

FIG. 7a shows a bearing according to a first embodiment example, in which the bearing 24, which is provided for mounting the device 2 on a frame or part of a motor vehicle, is arranged directly on the fastening means 7.

According to the second embodiment shown in FIG. 7b, in addition to the arrangement of a bearing 24 on the fastening means 7, an arrangement of a further bearing 24 is provided between the first conically shaped section 3a and the guide element 8, which corresponds to a particularly stable arrangement. According to such an arrangement, in particular the load at load-critical points, such as the fastening means or the pins, is minimized and thus a balanced loading of the device 2 according to the invention is made possible, which leads to a lower deflection.

Alternatively, in the context of the most stable and durable configuration possible, it is also conceivable that only one bearing is provided per control element 10a, 10b, which is then, however, arranged between the conically shaped partial area 3a or 3b and the guide element 8.

Figure 8:
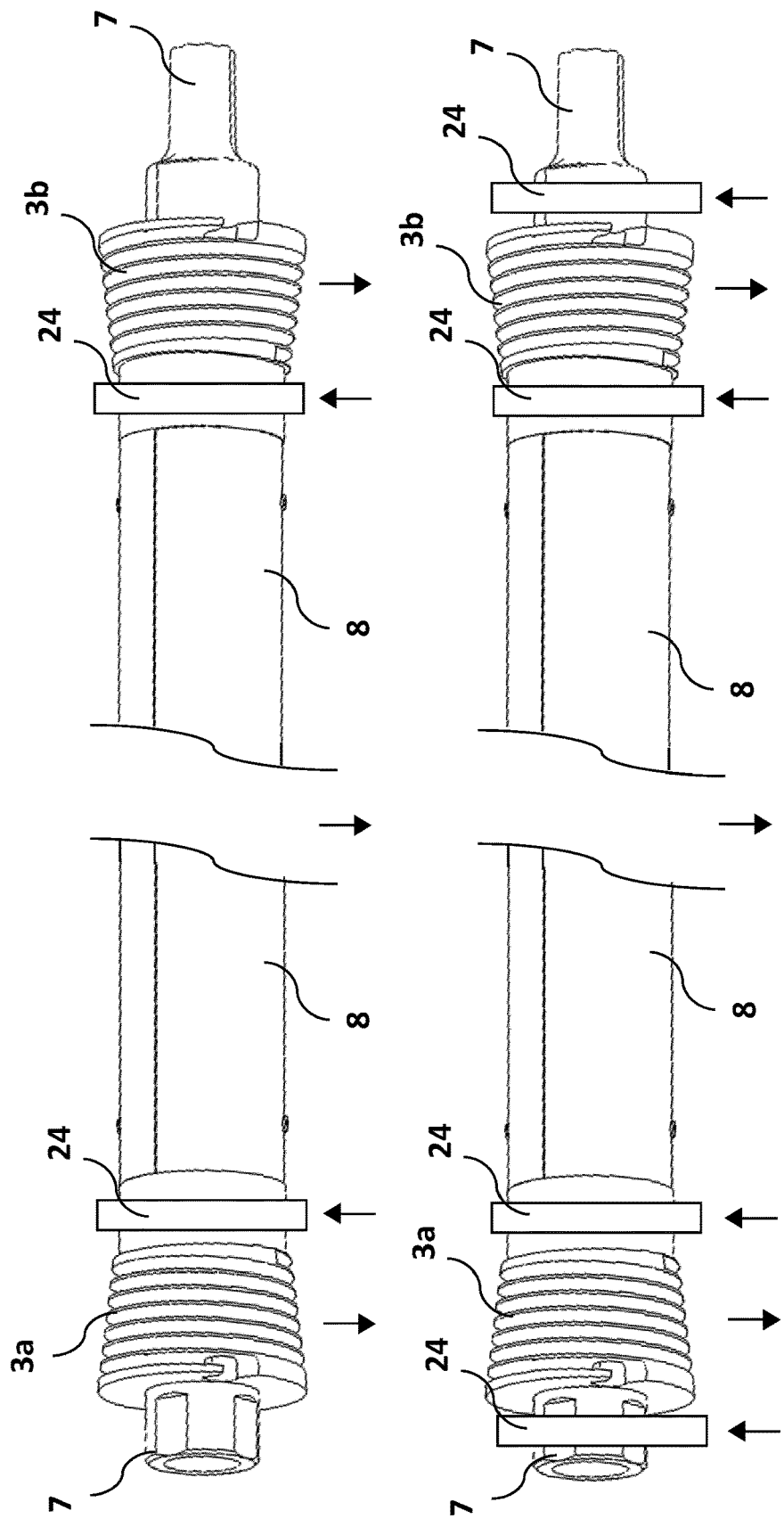

FIG. 8 shows a further schematic representation of the possibility of the bearing arrangement of the device 2 according to the invention for controlling and guiding a closure element 4 via the first and the second conically shaped partial areas 3a, 3b, in which, in particular, the symmetrical arrangement of the bearings 24 at the two ends or the two conically shaped partial areas 3a, 3b is apparent.

The upper illustration shows an arrangement of the bearing according to the third embodiment, whereas the lower illustration shows a bearing according to the second embodiment. The downward pointing arrows indicate the main direction of the load, whereas the upward pointing arrows represent the forces to compensate for the downward pointing forces generated by the bearing points according to the invention.

Figure 9:
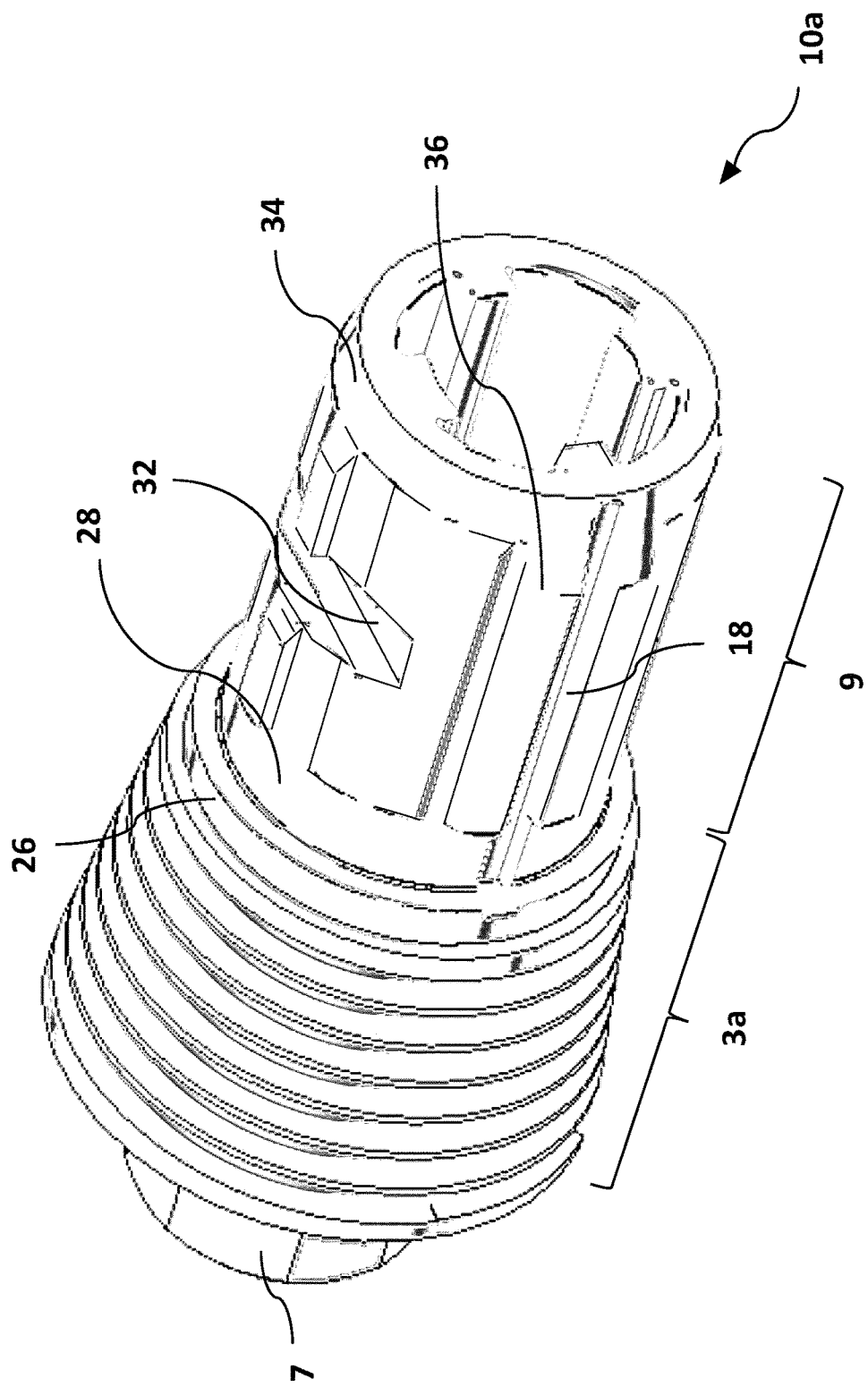

FIG. 9 shows a schematic representation of the first control element 10a of the device 2 according to the invention for controlling and guiding a closure element 4 in a detailed representation according to a first embodiment.

As can be seen from FIG. 9, the first control element 10a comprises a fastening means 7, a first conically shaped partial area 3a as well as a connecting area 9. Between the conically shaped partial area 3a and the connecting area 9, a receiving area 26 for receiving the bearings 24 is provided in the present case, which surrounds the entire circumference of the control element 10a in the present case. For receiving removed material during assembly, in particular during connection of the control element 10a to the guide element 8, the first control element 10a also has a recess 28 arranged at the end of the connecting area 9 for receiving removed material, which recess 28 also surrounds the entire circumference of the first control element 10a.

Furthermore, a clearance 32 arranged within the connection area 9 is provided for receiving center marks, which in the present case is configured in the form of a groove-like recess that runs parallel to the thread 5 of the conically shaped partial area 3a.

Furthermore, the first control element 10a comprises a bevel 34 for facilitating an insertion of the control element 10a into the recesses 16 of the guide element 8, which in the present case is arranged at the end and surrounds the entire circumference of the control element 10a.

To generate a play-free connection between the control element 10a and the guide element 8, the control element 10a further comprises excessive adapting surfaces 36 for at least partial deformation during an assembly, with which the control element 10a can be pressed within the recesses 16 of the guide element 8.

Finally, according to FIG. 9, the adjustment means 18 configured in the form of a recess for ensuring correct assembly of the control element 10a with the guide element 8 can be removed.

Figure 10:
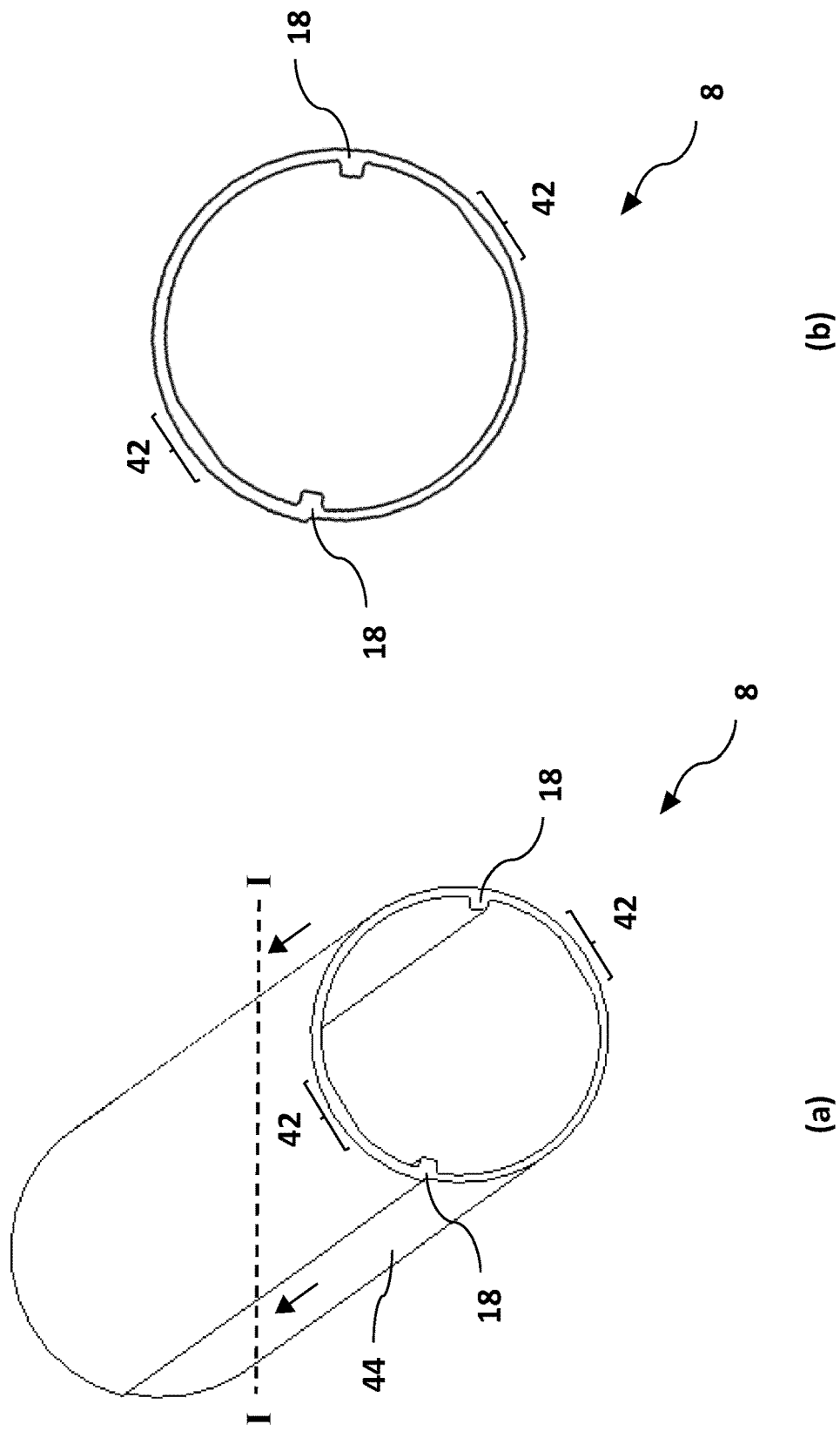

FIG. 10 shows a schematic representation of the guide element 8 according to the invention in a spatial representation (a) and a sectional representation according to a section along the line of intersection I-I from FIG. 10a (b).

In addition to the flattened surface areas 42 arranged opposite one another for ensuring correct assembly of the guide element 8 with the control elements 10a, 10b, the adjustment means 18 arranged on the inside of the guide element 8 and configured in the form of ribs can be seen according to FIG. 10, which also help to prevent incorrect assembly of the present device 2 for controlling and guiding a closure element 4. Finally, according to FIG. 10a, the graduated adhesive surface 44 arranged on the outer surface of the guide element 8 for the material-locking fixing of a closure element 4 can be seen, which is configured continuously in the example shown.

Figure 11:
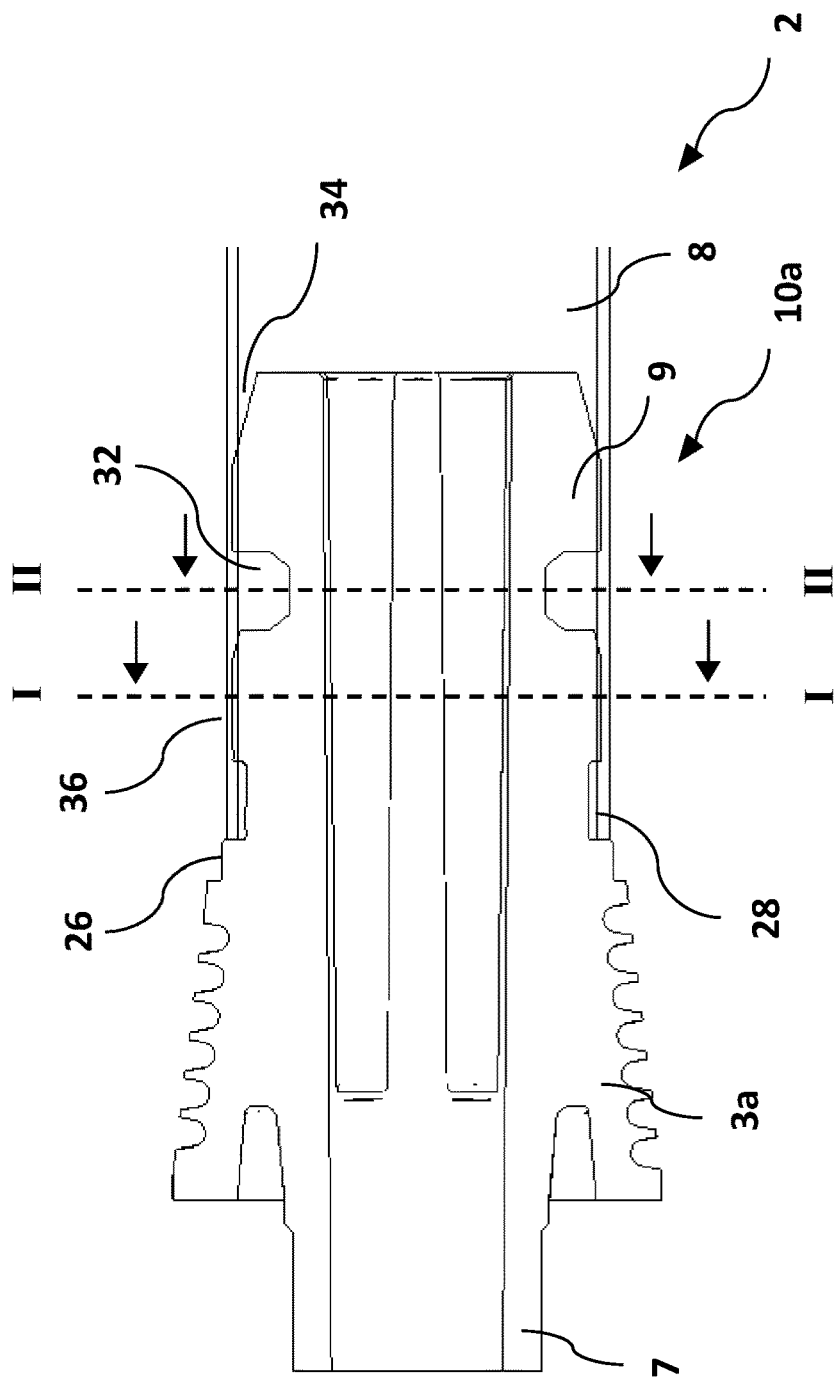

FIG. 11 shows a schematic representation of a part of the device 2 according to the invention for controlling and guiding a closure element 4 in a longitudinal section according to a first embodiment.

In addition to the structure of the first control element 10a provided according to the invention consisting of fastening means 7, first conically shaped partial area 3a and connecting area 9, in particular the receiving area 26 for receiving the bearings 24, the recess 28 for receiving removed material as well as the excessive adapting surfaces 36 for at least partial deformation during an assembly can be seen. Furthermore, FIG. 11 shows the clearances 32 for receiving the center marks as well as the bevel 34 for facilitating an insertion of the control element 10a into the guide element 8.

Figure 12:
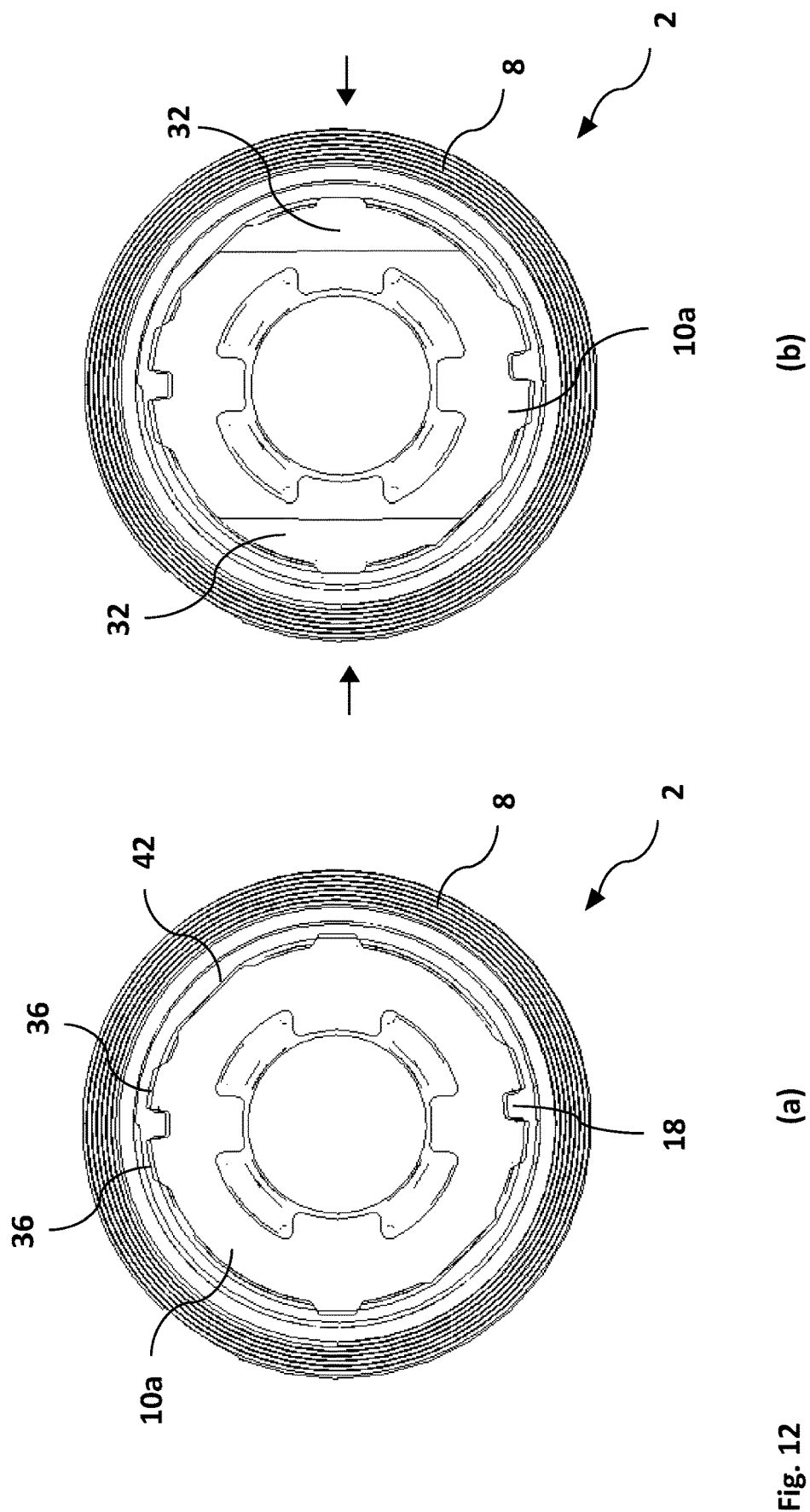

FIG. 12 shows a schematic representation of the device 2 according to the invention for controlling and guiding a closure element 4 according to a section along section line I-I (a) and along section line II-II (b) of FIG. 11.

FIG. 12a shows in particular the adjustment means 18 configured in the form of ribs to ensure a correct connection between the guide element 8 and the first control element 10a, as well as the surface areas 42 flattened along its inner surface to ensure a correct assembly.

Furthermore, FIG. 12a also shows the excessive adapting surfaces 36 arranged on the first control element 10a for at least partial deformation during an assembly.

FIG. 12b also shows, in particular, the clearances 32 for accommodating center marks, which serve to provide a play-free connection between the first control element 10a and the guide element 8 and can be incorporated by applying force along the arrows to the guide element 8 during assembly.

LIST OF REFERENCE SIGNS

1 System for closing a motor vehicle cooling module
2 Device for controlling and guiding a closure element
3a First conical shaped section
3b Second conical shaped section
3c first variable shape molded section
3d Second variable shape molded section
4 Closure element
5 Thread
5' Threaded section
7 Fasteners
8 Guide element
9 Connection area
10 First control element
10 Second control element
11 External shape
12a First outer surface
12b Second outer surface
14a First cable pull
14b Second cable pull
16 Recess
18 Adjustment means
20 Guide means
22 Form fitting connection means
24 Bearing
26 Receiving area
28 Recess
32 Clearance
34 Bevel
36 Excessive adapting surface
42 Flattened surface
44 Adhesive surface
X Main alignment axis of the guide element
Q Cross-sectional area of the guide element
D Diameter increase/decrease
I-VI Regular n-polygon

The invention claimed is:

1. A device for controlling and guiding a closure element for closing a motor vehicle cooling module, comprising:
a first control element for controlling an opening and a closing movement of the closure element,
a second control element for controlling an opening and a closing movement of the closure element, and
a guide element arranged directly between the first and the second control element for guiding the closure element during an opening and a closing movement,
wherein
the device is configured in multiple parts and is composed of parts produced separately from one another, wherein the guide element has two recesses arranged on the outer surfaces for receiving the control elements, wherein the recesses arranged on the outer surfaces of the guide element are configured point-symmetrically.

2. The device according to claim 1,
wherein
at least the guide element is configured in the form of a winding shaft onto which the closure element can be wound during an opening movement and from which the closure element can be unwound during a closing movement or
wherein
the guide element is configured in the form of an extruded profile.

3. The device according to claim 1,
wherein
the point of symmetry simultaneously forming the center of the cross-sectional area of the guide element or
wherein
the recesses arranged on the outer surfaces are configured in a shape corresponding to the external shape of a connecting area of the control elements.

4. The device according to claim 1,
wherein
the guide element has a graduated adhesive surface arranged on the outer surface for firmly bonded fixing a closure element, the adhesive surface being of continuous configuration.

5. The device according to claim 1,
wherein
at least the guide element or the control elements have adjustment means for ensuring a correct connection between the guide element and the control elements, the adjustment means of the guide element only being arranged in a correct positioning of the guide element with respect to the control elements in a form corresponding to the adjustment means of the control elements.

6. The device according to claim 5,
wherein
the adjustment means are configured in the form of ribs and corresponding recesses, the ribs being arranged within the guide element and the recesses being arranged within the first and second control elements.

7. The device according to claim 1,
wherein
at least the guide element has flattened surface areas along an inner surface, at least two flattened surface areas being arranged along the circumference of the guide element or the guide element is configured from a lightweight material having a density of less than 3 g/cm$^3$.

8. The device according to claim 1,
wherein
at least the control elements are connected to the guide element in a form fitting manner, wherein at least the control elements or the guide element comprising at least one form fitting connecting means or the control elements are configured from a hard metal material.

9. The device according to claim 1, wherein
at least the first and second control elements have conically shaped partial areas in order to compensate for a diameter increase and diameter decrease of the guide element caused by the winding and unwinding of the closure element or
the first and second control elements have variably shaped partial areas in order to compensate for a diameter increase and diameter decrease of the guide element caused by the winding and unwinding of the closure element, the variably shaped partial areas.

10. The device according to claim 9, wherein
the thread sections are configured in the form of regular n-polygons, the number n of n-polygons decreasing or increasing continuously from one end to the other of the control elements.

11. The device according to claim 1, wherein
at least two bearings are provided for mounting the device on a frame or part of a motor vehicle, the bearings being arranged at least partially between the guide element and the first and second control elements.

12. The device according to claim 1, wherein
at least four bearings are provided for mounting the device on a frame, the bearings being arranged at least partially between the guide element and the first and second control elements and at the end on the fastening means of the first and second control elements.

13. The device according to claim 1, wherein
at least the first or second control element has receiving areas for receiving the bearings, the receiving areas being arranged between the conically shaped partial areas and the connecting areas, the receiving areas surrounding at least the first or second control element.

14. The device according to claim 1, wherein
at least the first or second control element has a recess for receiving removed material, the recess being arranged at the end of the connecting area, adjacent to the conically shaped partial areas, the recess surrounding at least the first or second control element.

15. The device according to claim 1, wherein
at least the first or second control element has a clearance for receiving center marks, the clearance being configured in the form of a groove-like recess.

16. The device according to claim 1, wherein
at least the first or second control element has a bevel for facilitating insertion of the control elements into the recesses of the guide element, the bevel being arranged at the end inside the connecting area, the bevel surrounding at least the first or second control element.

17. The device according to claim 1, wherein
at least the first or second control element has excessive adapting surfaces for at least partial deformation during assembly, wherein at least the first or second control element can be pressed via the excessive adapting surfaces within the recesses of the guide element.

18. The device according to claim 1, wherein
at least the first and second control elements each comprise a shaft and a respective cable pull arranged on the shaft, the first cable pull being connected to the first control element and the second cable pull being connected to the second control element or the cable pulls are configured in the form of Bowden cables.

19. A system for closing a motor vehicle cooling module, comprising
a device for controlling and guiding a closure element for closing a motor vehicle cooling module, comprising:
a first control element for controlling an opening and a closing movement of the closure element,
a second control element for controlling an opening and a closing movement of the closure element,
a guide element arranged directly between the first and the second control element for guiding the closure element during an opening and a closing movement,
wherein the device is configured in multiple parts and is composed of parts produced separately from one another, wherein the guide element has two recesses arranged on the outer surfaces for receiving the control elements, wherein the recesses arranged on the outer surfaces of the guide element are configured point-symmetrically, and
the closure element for closing a motor vehicle cooling module.

20. The system according to claim 19, wherein
at least the closure element is configured in the form of a textile or
the guide element is arranged between the first and second control elements in such a way that the main alignment axis of the guide element is aligned essentially perpendicular to an opening and closing movement of the closure element.

21. The system according to claim 19, wherein
at least the control elements are connected to the closure element via the first and second cable pulls, the connection being configured such that the cable pulls are wound up by the control elements during an opening movement and are unwound from the control elements during a closing movement or
a guide means is provided for guiding the control elements, wherein the guide means can be configured in the form of an actuator.

22. The system according to claim 19, wherein
at least a detection unit is provided for acquiring data for determining a current position of a closure element in relation to at least a vehicle height or a current temperature or a current tensile stress or a current speed or a current energy consumption or
a processing unit is provided for sending a control command to the guide means on the basis of the acquired data.

23. A motor vehicle comprising a device for controlling and guiding a closure element for closing a motor vehicle cooling module, comprising
a first control element for controlling an opening and a closing movement of the closure element,
a second control element for controlling an opening and a closing movement of the closure element, and
a guide element arranged directly between the first and the second control element for guiding the closure element during an opening and a closing movement, wherein the device is configured in multiple parts and is composed of parts produced separately from one another, wherein the guide element has two recesses arranged on the outer surfaces for receiving the control elements, wherein the recesses arranged on the outer surfaces of the guide element are configured point-symmetrically.

* * * * *